United States Patent
Turnquist et al.

(10) Patent No.: US 6,439,844 B1
(45) Date of Patent: Aug. 27, 2002

(54) TURBINE BUCKET COVER AND BRUSH SEAL

(75) Inventors: Norman Arnold Turnquist, Sloansville; Lawrence D. Willey, Burnt Hills; Christopher Edward Wolfe, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/733,293

(22) Filed: Dec. 11, 2000

(51) Int. Cl.[7] .............................................. F01D 11/12
(52) U.S. Cl. .......................... 415/173.3; 415/173.5; 415/173.6; 415/174.2; 415/174.5; 416/191
(58) Field of Search ....................... 415/173.3, 173.5, 415/173.6, 174.2, 174.5, 230, 231; 416/189, 190, 191, 195; 277/412, 416, 421, 355

(56) References Cited

U.S. PATENT DOCUMENTS

| | | | | |
|---|---|---|---|---|
| 2,610,823 A | * | 9/1952 | Knowlton, Jr. ............. 416/190 |
| 3,857,650 A | * | 12/1974 | Cerrato ...................... 416/189 |
| 3,970,318 A | * | 7/1976 | Tuley ....................... 415/209.2 |
| 4,840,539 A | * | 6/1989 | Bourcier et al. ............ 416/191 |
| 5,941,685 A | * | 8/1999 | Bagepalli et al. ......... 415/173.3 |
| 6,036,437 A | | 3/2000 | Wolfe et al. ............. 415/173.3 |

FOREIGN PATENT DOCUMENTS

JP    55-023320 A   *   2/1980

OTHER PUBLICATIONS

Robert C. Hendricks et al. "Integrity Testing of Brush Seal in Shroud Ring of T–700 Engine", May 24–27, 1993, pp. 1–11.

* cited by examiner

Primary Examiner—Edward K. Look
Assistant Examiner—Richard Woo
(74) Attorney, Agent, or Firm—Enrique Abarca; Donald S. Ingraham (57) ABSTRACT

The adjoining edges of bucket covers are sealed one to the other. A brush seal projecting from a stationary shroud overlies the bucket covers. A joint at which the adjacent covers sealingly engage each other precludes radial outflow of high pressure fluid into bristles of the brush seal, preventing radial and axial deflection of the bristles and consequent failure of the bristles. The joints between the covers may comprise lap or tongue-and-groove joints.

21 Claims, 7 Drawing Sheets

TURBINE BUCKET COVER AND BRUSH SEAL

BACKGROUND OF THE INVENTION

This invention relates to covers carried by the tips of turbine buckets and brush seals surrounding and engaging the bucket covers, and more particularly relates to seals between the adjoining edges of bucket covers for minimizing or eliminating radial outflow of the fluid medium flowing through the turbine onto the bristles of the surrounding brush seal.

As set forth in U.S. Pat. No. 6,036,437, of common assignee herewith, turbine bucket covers and brush seals surrounding the bucket covers for sealing between upstream and downstream portions of a turbine stage are known. Turbine bucket covers are typically provided in either of two forms. A bucket and a discrete bucket cover are often integrally cast one with the other and applied to the turbine wheel. Adjoining edges of the adjacent covers typically form a generally Z-shaped joint as viewed in a radial direction. Other bucket covers are provided in the form of a cover band which spans two or more buckets. The bucket cover bands typically have openings for receiving tenons formed on the tips of the buckets and which tenons are peened to secure the cover bands to the bucket. Like the integrally cast buckets and covers, the adjoining edges of the cover bands engage one another, generally in a Z-shaped joint when viewed radially.

As will be appreciated, the pressure of the fluid medium within the flow path through the turbine, for example, steam flowing in the steam path of a steam turbine, is at a significantly higher pressure than the steam pressure radially outwardly of the covers. This difference in pressure causes radial outflow of the fluid medium through the gaps between the edges of adjoining covers. These gaps permit both radial and axial outflow of the fluid medium and turbine performance is thereby degraded. Labyrinth seals and/or brush seals are typically employed in the shroud surrounding the buckets and covers and those seals can limit the performance losses attributable to axial flow through and around the gaps. Brush seals also afford an added performance benefit over the use of labyrinth seals. However, turbine bucket tip brush seals are affected by radial flow in the region of the bristle pack. The radial flow into the bristle pack through the radial gaps between the bucket covers causes bristle fatigue and failure. That is, the discrete flows of the fluid medium radially outwardly through the gaps between adjacent bucket covers tend to deflect the bristles in an outward direction, as well as to splay the bristles in an axial direction. Thus, for every pass of a gap by a given bristle location, the bristles are deflected both axially and radially by the radial flow. Moreover, the bristles attempt to recover before the next radial outward flow repeats those deflections. These deflection cycles cause bristle fatigue and failure. It will be appreciated that for a 60 Hz machine having eighty covers and gaps in a stage, a 40,000 Hz stimulus is provided to the bristle pack at the various circumferential locations of the bristles about the turbine wheel.

BRIEF SUMMARY OF THE INVENTION

In accordance with a preferred embodiment of the invention, the gaps between the adjoining edges of the covers are sealed to the extent that the radial flow leakage is minimized or eliminated. These portions of the edges of the adjoining covers interlock with one another such that radial leakage, e.g., steam, from the flow path is minimized or prevented, with the result that turbine performance is enhanced. By sealingly engaging the cover portions to one another along the area of contact between the tips of the bristles and the outer cover surfaces, the potentially damaging effect on the seal bristle pack by the radial outflow is eliminated. Particularly, the adjoining edges of the covers are overlapped with one another. For example, lap joints are formed between the adjoining edges. In another form, tongue-and-groove joints may be provided. In a still further form, additional cover segments may overlie the covers in staggered circumferential relation to the underlying covers such that the gaps between adjoining underlying covers are sealed by the overlying covers.

In another preferred embodiment, in a turbine having a plurality of rotatable buckets, a stationary shroud surrounding the rotatable buckets, and a fluid medium flow path through the turbine, sealing between the buckets and the stationary shroud is accomplished by a plurality of arcuate covers carried by radial outer ends of the buckets for rotation with the buckets about an axis of the turbine in a predetermined circumferential direction, the covers having leading and trailing edges in the direction of rotation of the buckets, a brush seal comprising a plurality of bristles projecting from the shroud for sealingly engaging outer surfaces of the covers, and a joint between circumferentially adjacent covers sealing adjoining leading and trailing edges thereof to one another, thus substantially precluding radial outflow of the fluid medium onto the bristles as the buckets and covers rotate relative to the brush seal.

In a further preferred embodiment, in a turbine having a plurality of rotatable buckets, a stationary shroud surrounding the rotatable buckets, and a fluid medium flow path through the turbine, sealing between the buckets and the stationary shroud is accomplished by a plurality of arcuate covers carried by radial outer ends of the buckets for rotation with the buckets about an axis of the turbine in a predetermined circumferential direction, the covers having adjoining edges, a brush seal comprising a plurality of bristles projecting from the shroud for sealingly engaging outer surfaces of the covers, and a joint between circumferentially adjacent covers including at least portions of the adjoining edges overlapping one another and sealingly engaging the adjacent covers to one another at axial locations corresponding to axial locations of the cover surfaces engaged by the bristles, to substantially preclude radial outflow of the fluid medium past the overlapping portions onto the bristles.

DETAILED DESCRIPTION OF THE INVENTION

Figure 1:
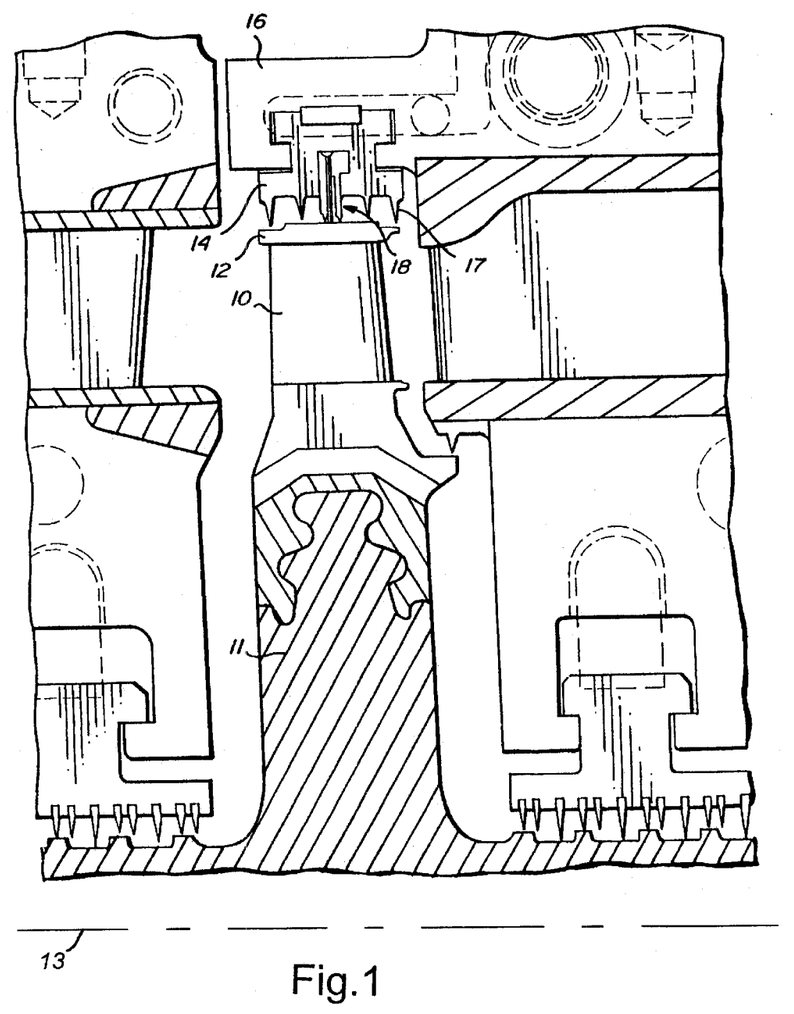
FIG. 1 is a view partly in cross section and in elevation taken in a radial plane along the axis of a turbine, illustrating buckets, bucket covers and bristles forming an improved seal according to a preferred embodiment of the invention.

FIG. 1 illustrates a plurality of buckets 10 forming part of a rotating component of turbomachinery such as a turbine and secured at their inner ends to turbine wheels 11 rotatable about an axis 13. The radial outer ends of buckets 10 are provided with bucket covers 12 which rotate with the buckets. A cover 12 may be provided on the radial outer end of each bucket or on the outer ends of two or more buckets in the form of a band so as to allow adjacent buckets to be coupled to a common cover or band 12. The joints between adjacent bucket covers or bands 12 are in a generally Z-shaped configuration as viewed in a radial direction (see for example FIG. 7).

Figure 8:
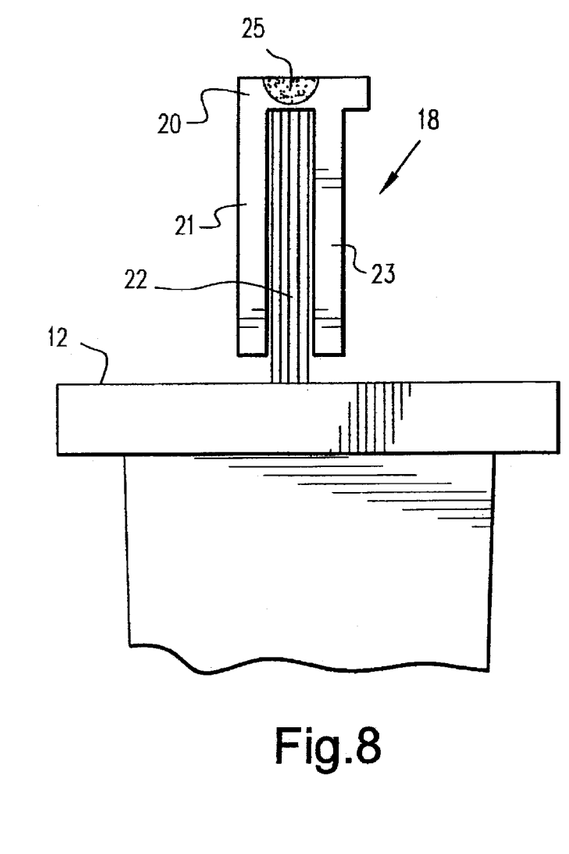
FIG. 8 is a cross-sectional view illustrating the engagement of the bristles and the bucket cover.

As illustrated in FIG. 1, a sealing shroud 14 is fixed to a stationary component 16 of the turbomachinery in radial opposition to the buckets in the plane of rotation. Typically, the sealing shroud includes a plurality of circumferentially spaced sealing segments forming an annulus about bucket covers 12. The shroud or shroud segments include axially spaced labyrinth teeth 17 to effect a seal between the stationary component and the rotatable bucket covers. In lieu of the labyrinth seal, or in combination with the labyrinth seal as illustrated, a brush seal 18 is provided. Brush seal 18, as shown in FIG. 8, may comprise a brush seal bracket 20 housing a plurality of bristles 22 which project from bracket 20 and engage their tips or distal ends against outer surfaces of bucket covers 12. Bracket 20 may comprise a pair of parallel plates 21 and 23 joined to one another at their proximal ends by a weld 25 that also serves to secure the bristles to bracket 20. Bracket 20 is segmented circumferentially such that a plurality of such brackets form an annular brush seal about bucket covers 12.

Figure 2:
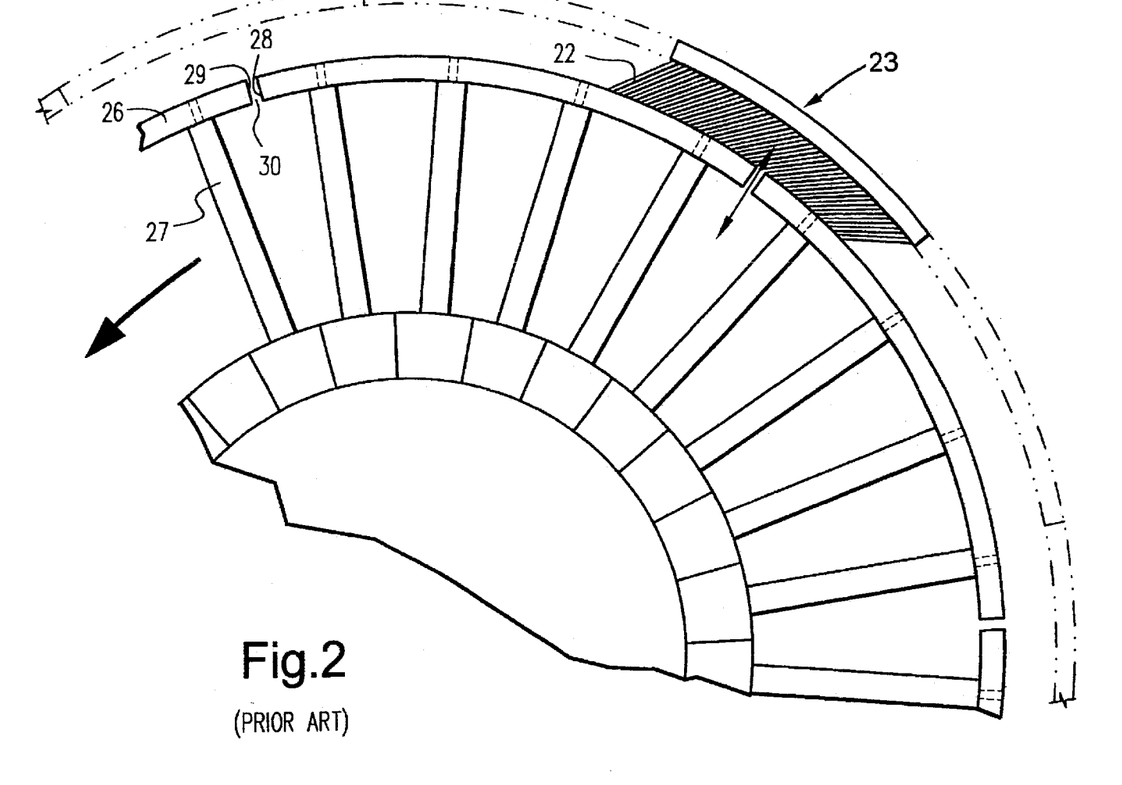
FIG. 2 is a partial schematic view in an axial direction illustrating buckets, bucket covers and a brush seal segment according to the prior art.

FIG. 2 illustrates bucket covers 26 of the prior art as extending circumferentially between two or more buckets 27. Adjoining edges 28 and 29 of circumferentially extending bucket covers 26 form a gap 30 that permits flow of a high pressure fluid medium, e.g., steam in a steam turbine, radially outwardly between bucket covers 26 for radial impact on bristles 22 of a brush seal 23. The radial outward flow deflects bristles 22 both radially and axially and at high frequency as gaps 30 between bucket covers 26 rotate past the stationary bristles, tending to degrade turbine performance and also causing bristle fatigue and failure.

Figure 3:
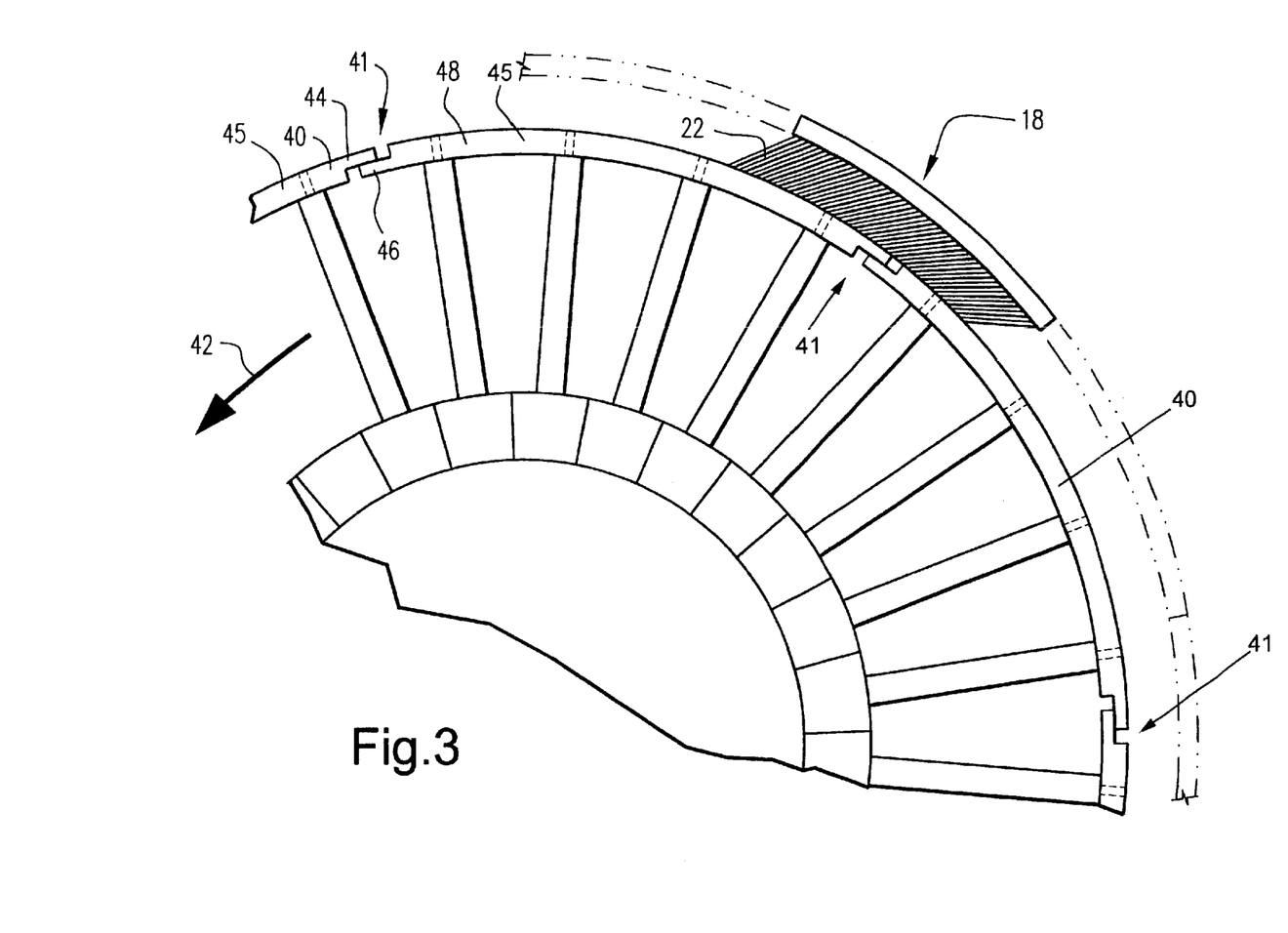
FIGS. 3, 4, 5 and 6 are partial schematic views in an axial direction illustrating various preferred embodiments of the invention.

FIG. 3 illustrates a brush seal 18 having bristles 22 in engagement with bucket covers 40. Instead of gaps between adjacent bucket cover segments, the adjoining edges of the adjacent cover segments form lap joints 41. For example, and as illustrated in FIG. 3, the trailing edge portion 44 of each leading bucket cover 45 in the direction of rotation indicated by arrow 42 lies radially outwardly of, and overlaps in sealing engagement with, a radially inward leading edge portion 46 of the trailing bucket cover 48. The overlapped edge portions 44 and 46 form a seal between bucket covers 45 and 48. The lapped joint is provided at each of the adjoining edges of circumferentially adjacent bucket covers or cover bands.

Figure 7:
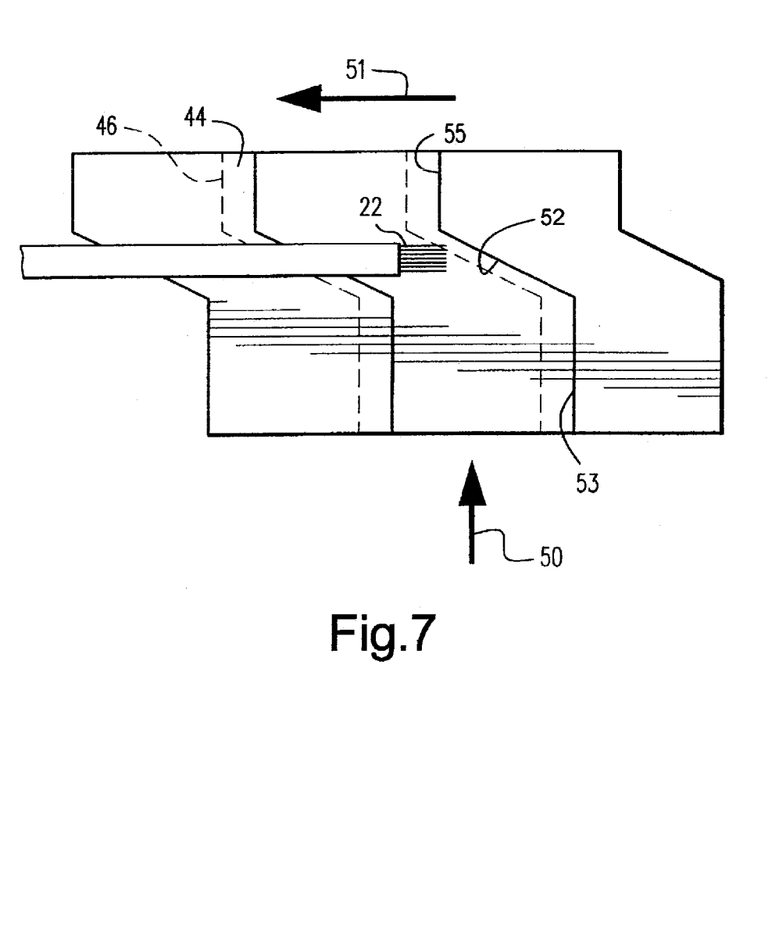
FIG. 7 illustrates a plurality of bucket covers and a brush seal looking in a radially inward direction down to a plane normal to the axis of rotation of the turbine bucket.

The bucket cover bands or segments have an axial extent greater than the axial extent of bristles 22 forming the bristle pack of brush seal 18. Preferably, the tips of bristles 22 engage the bucket cover outer surfaces at an axial location along a downstream side of the cover, as distinguished from an upstream side of the cover. In FIG. 7, the fluid medium flow is indicated by arrow 50 and the direction of rotation of the bucket covers is indicated by arrow 51. The brush seal bristles 22 engage the downstream sides of the bucket covers. Additionally, as illustrated in FIG. 7, the joint between the adjacent bucket covers such as covers 45 and 48 is generally Z-shaped in configuration, and thus the adjoining overlapped edge portions 44 and 46 of covers 45 and 48, respectively, have a similar generally Z-shaped configuration as illustrated by the parallel solid and dashed Z-shaped lines in FIG. 7. In this configuration, the brush seal bristles engage the outer surfaces of covers 40 at an axial location corresponding to the axial locations of intermediate axially angled margins 52 of the Z-shaped joint. While the lapped joint may extend for the full extent of the adjoining edges in an axial direction, it is important that the bristle tips engage the bucket covers at an axial location of the lapped joint. The linear extending margins 53 and 55 along upstream and downstream sides respectively of the adjoining covers 40 need not be lapped, provided the angled margins 52 are lapped to form a seal and the bristle tips engage the outer surfaces of the covers at the axial location of the seal thus formed, i.e. the lapped joint, to preclude radial outflow of high pressure fluid medium into the bristle pack.

Figure 4:
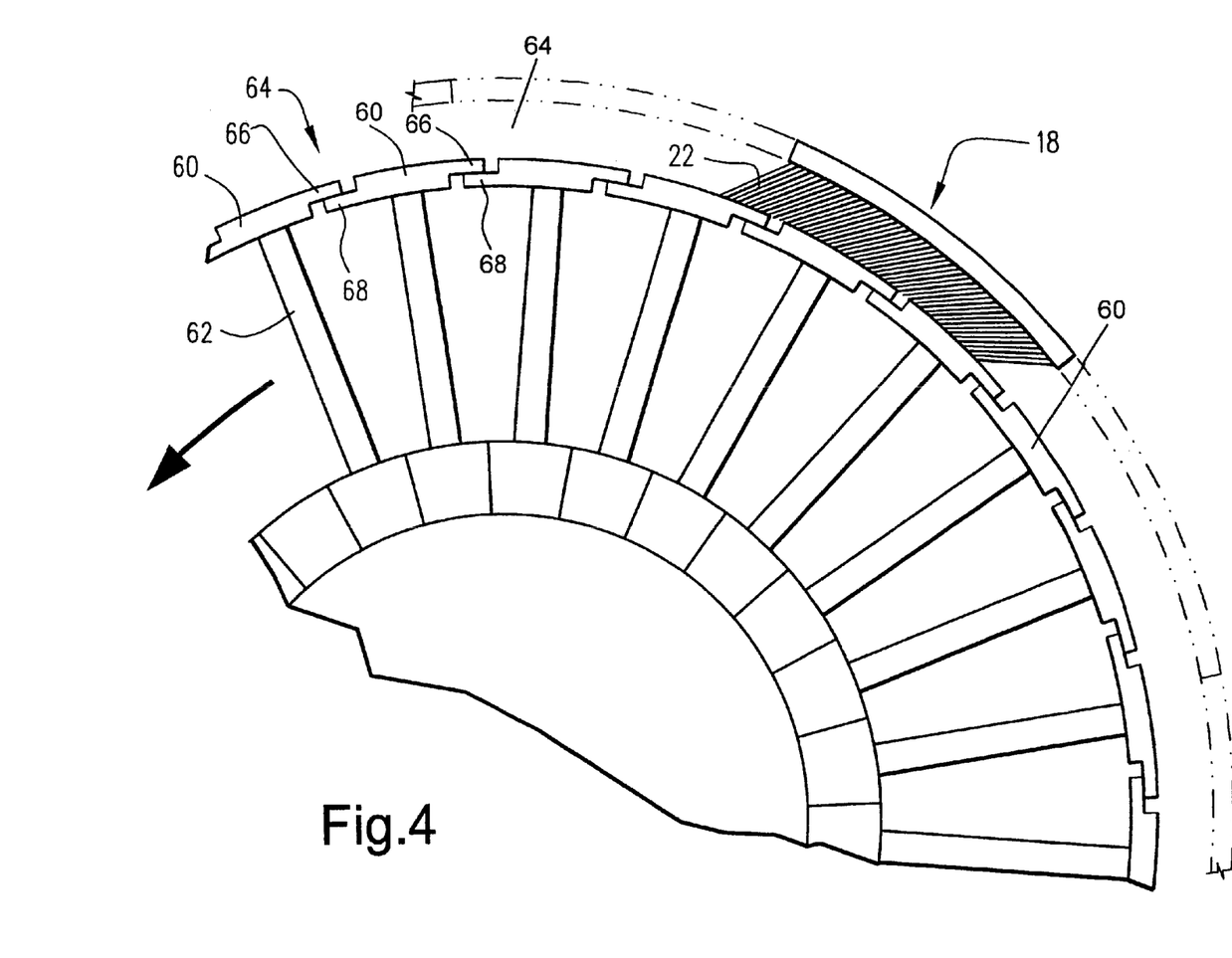

FIG. 4 illustrates lapped joints between adjacent bucket covers 60 of individual buckets. That is, instead of bucket cover bands or segments spanning two or more buckets as illustrated in FIG. 3, a discrete bucket cover 60 is provided for each bucket, respectively. A lapped joint 64 is illustrated between each respective pair of adjoining edges 66 and 68.

Figure 5:
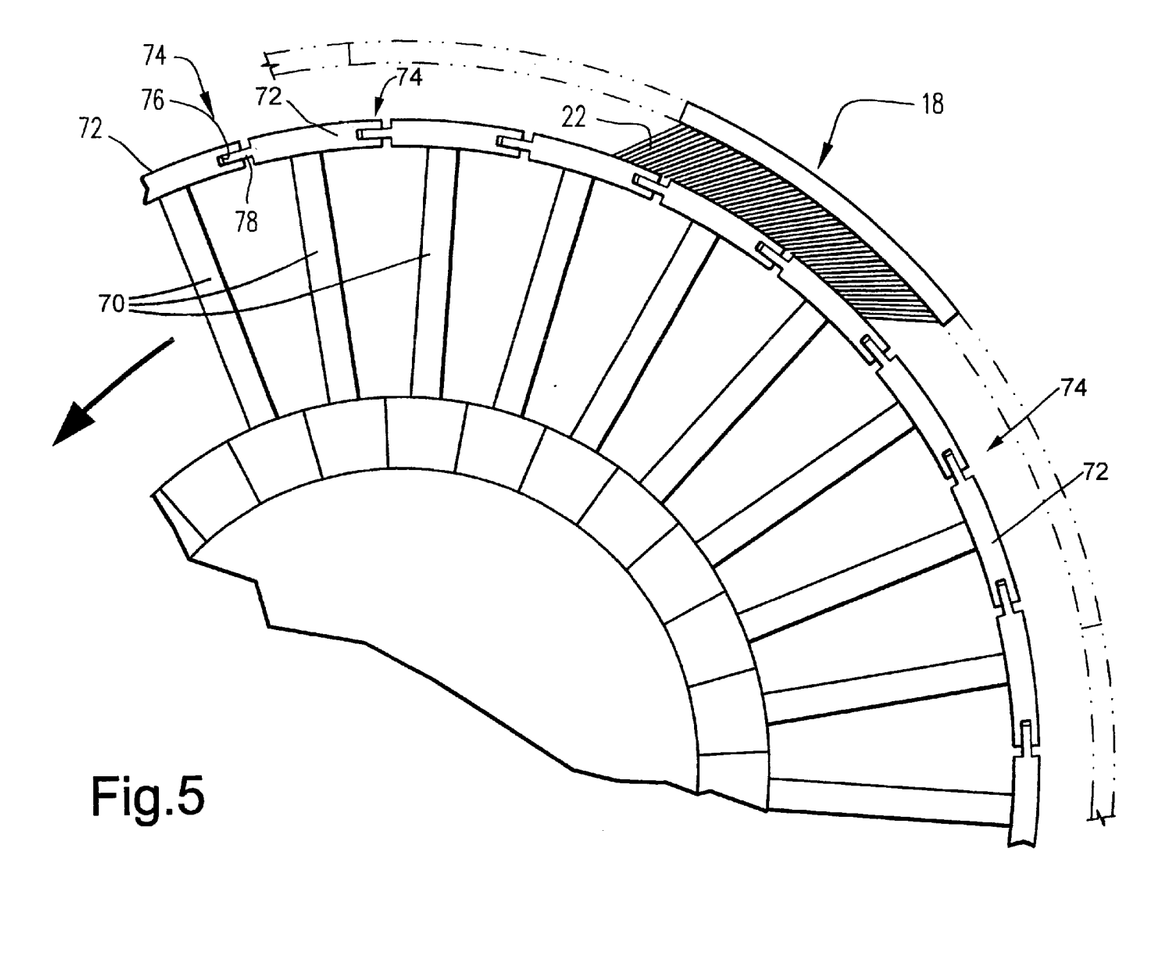

As shown in FIG. 5, each one of buckets 70 is provided with an individual bucket cover 72, respectively. Adjoining edges of bucket covers 72 are provided with tongue-and-groove connections 74. For example, the leading bucket cover has a generally axially extending slot 76 for receiving a tongue 78 formed along the leading edge of a trailing bucket cover. In this manner, the tongue-and-groove forms an overlapping seal, preventing radial outflow of the high pressure fluid medium in the axial flow stream into the bristles of brush seal 18. As in the preceding embodiments, the bristle pack is located at an axial position radially overlying the seal between adjoining bucket covers. The tongue-and-groove overlapping seal may also be used with bucket cover segments spanning two or more buckets, in the manner illustrated in FIG. 5 with respect to the discrete covers on individual buckets.

Figure 6:
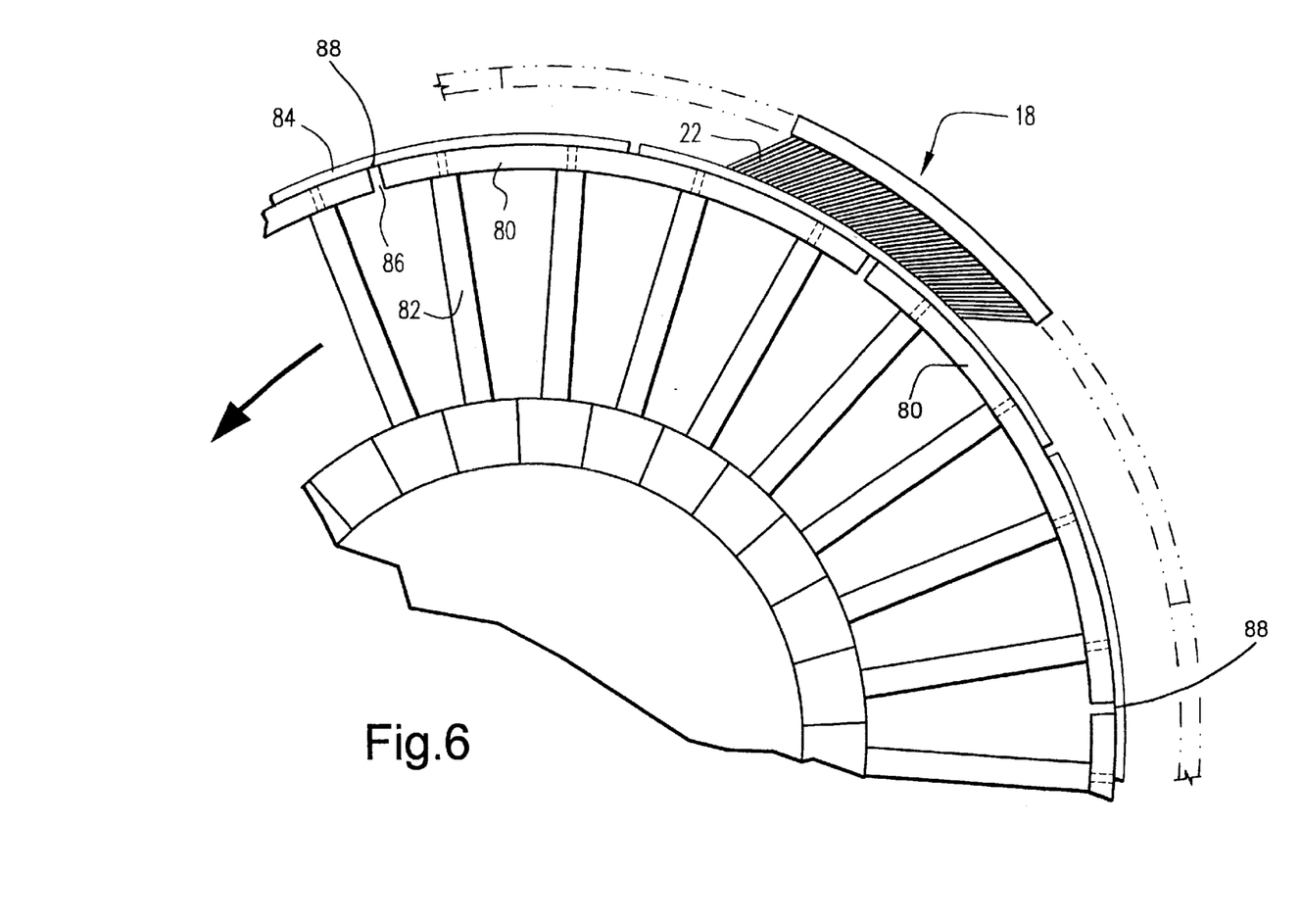

FIG. 6 illustrates a plurality of bucket covers or bands 80 spanning in a circumferential direction a plurality of buckets 82. In this embodiment, however, a second or outer cover 84 overlies inner covers 80 at circumferentially staggered locations relative to the inner covers. Thus, as illustrated, outer covers 84 are provided in discrete lengths as bands or segments. These outer covers 84 also span circumferential gaps 86 between adjacent inner covers 80 and hence together with adjacent covers 80 form a sealed joint 88 therebetween. The overlying covers 84 thus seal gaps 86 and also seal at axial locations corresponding to the axial location of the engagement of the bristle tips along covers 84. As a consequence, the bristles engage outer covers 84 along surfaces which do not have any radial outflow of high pressure fluid medium that would tend to deflect the bristles and cause fatigue.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. In a turbine having a plurality of rotatable buckets, a stationary shroud surrounding the rotatable buckets, and a fluid medium flow path through the turbine, a seal between said buckets and said stationary shroud, comprising:

a plurality of arcuate covers carried by radial outer ends of said buckets for rotation with said buckets about an axis of the turbine in a predetermined circumferential direction, said covers having leading edges and trailing edges in the direction of rotation of the buckets;

a brush seal projecting from the shroud and comprising a plurality of bristles for sealingly engaging radially outer surfaces of said covers; and a joint between circumferentially adjacent covers wherein adjoining leading and trailing edges sealingly engage one another substantially to preclude radial outflow of the fluid medium onto said bristles as the buckets and covers rotate relative to the brush seal.

2. A seal according to claim 1 wherein said joint comprises a lap joint.

3. A seal according to claim 1 wherein said joint comprises a tongue-and-groove joint.

4. A seal according to claim 1 wherein each of said buckets includes a discrete cover, said bucket and said cover being integrally cast.

5. A seal according to claim 4 wherein said joint comprise a lap joint.

6. A seal according to claim 4 wherein said joint comprise a tongue-and-groove joint.

7. A seal according to claim 1 wherein said covers form a discrete band extending in a circumferential direction, said band being connected to at least two adjacent buckets.

8. A seal according to claim 7 wherein said joint comprises a lap joint.

9. A seal according to claim 7 wherein said joint comprises a tongue-and-groove joint.

10. A seal according to claim 1 wherein said adjoining edges have linear, generally axially extending, end margins axially and circumferentially spaced from one another and angled margins intermediate said end margins and interconnecting said end margins, said brush seal bristles engaging said cover surfaces at an axial location corresponding to axial locations of said intermediate angled margins.

11. A seal according to claim 1 wherein said joint includes an outer cover overlying said covers and spanning between said adjacent covers, said outer cover sealing any gap between said adjacent covers.

12. In a turbine having a plurality of rotatable buckets, a stationary shroud surrounding the rotatable buckets, and a fluid medium flow path through the turbine, a seal between said buckets and said stationary shroud, comprising:

a plurality of arcuate covers carried by radial outer ends of said buckets for rotation with said buckets about an axis of the turbine in a predetermined circumferential direction, said covers having adjoining edges;

a brush seal projecting from the shroud and comprising a plurality of bristles for sealingly engaging radially outer surfaces of said covers;

a joint between circumferentially adjacent covers wherein at least portions of said adjoining edges overlap one another to substantially seal said adjacent covers to one another at axial locations corresponding to axial locations of said cover surfaces engaged by said bristles to substantially preclude radial outflow of the fluid medium past the overlapping portions of said adjoining edges.

13. A seal according to claim 12 wherein said joint comprises a lap joint.

14. A seal according to claim 12 wherein said joint comprises a tongue-and-groove joint.

15. A seal according to claim 12 wherein each of said buckets includes a discrete cover, each said bucket and said cover being integrally cast.

16. A seal according to claim 15 wherein said joint comprises a lap joint.

17. A seal according to claim 15 wherein said joint comprises a tongue-and-groove joint.

18. A seal according to claim 12 wherein said covers form a discrete band extending in a circumferential direction, said band being connected to at least two adjacent buckets.

19. A seal according to claim 18 wherein said joint comprises a lap joint.

20. A seal according to claim 18 wherein said joint comprises a tongue-and-groove joint.

21. A seal according to claim 12 wherein said adjoining edges have linear, generally axially extending, end margins axially and circumferentially spaced from one another and angled margins intermediate said end margins and interconnecting said end margins, said brush seal bristles engaging said cover surfaces at an axial location corresponding to axial locations of said intermediate angled margins.

* * * * *